J. G. MARIS.
DANGER OR STOP AND DIRECTION SIGNAL.
APPLICATION FILED FEB. 16, 1921.
1,384,205.
Patented July 12, 1921.
2 SHEETS—SHEET 1.
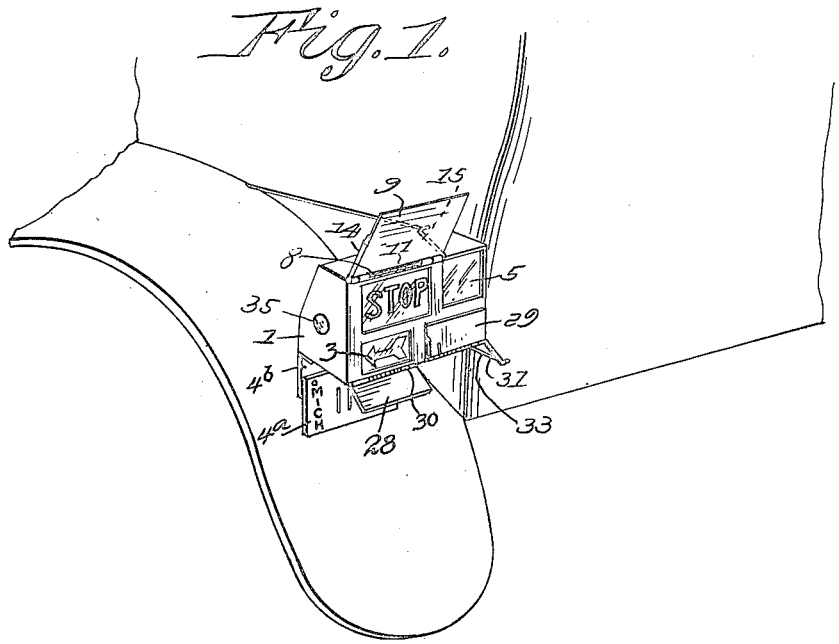
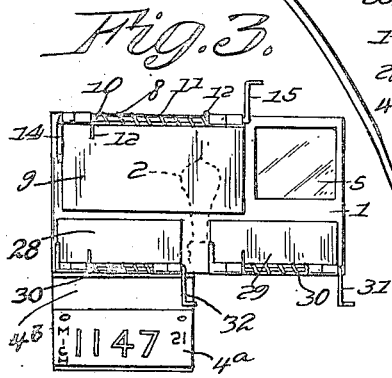
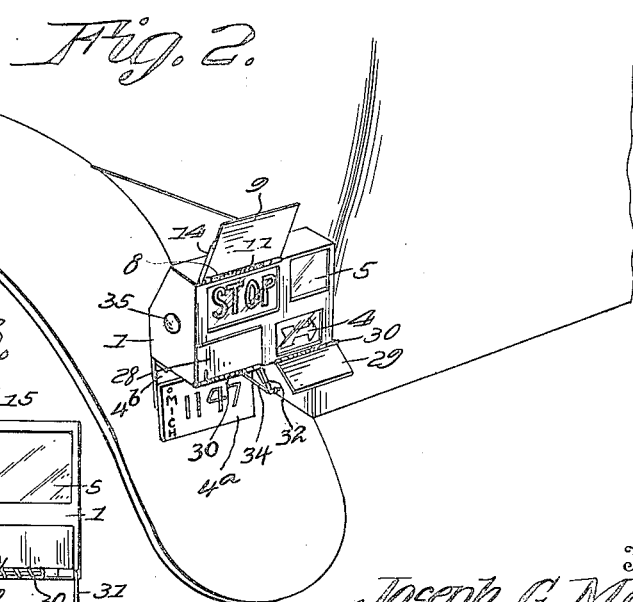
Inventor
Joseph G. Maris,
By Watson E. Coleman
Attorney

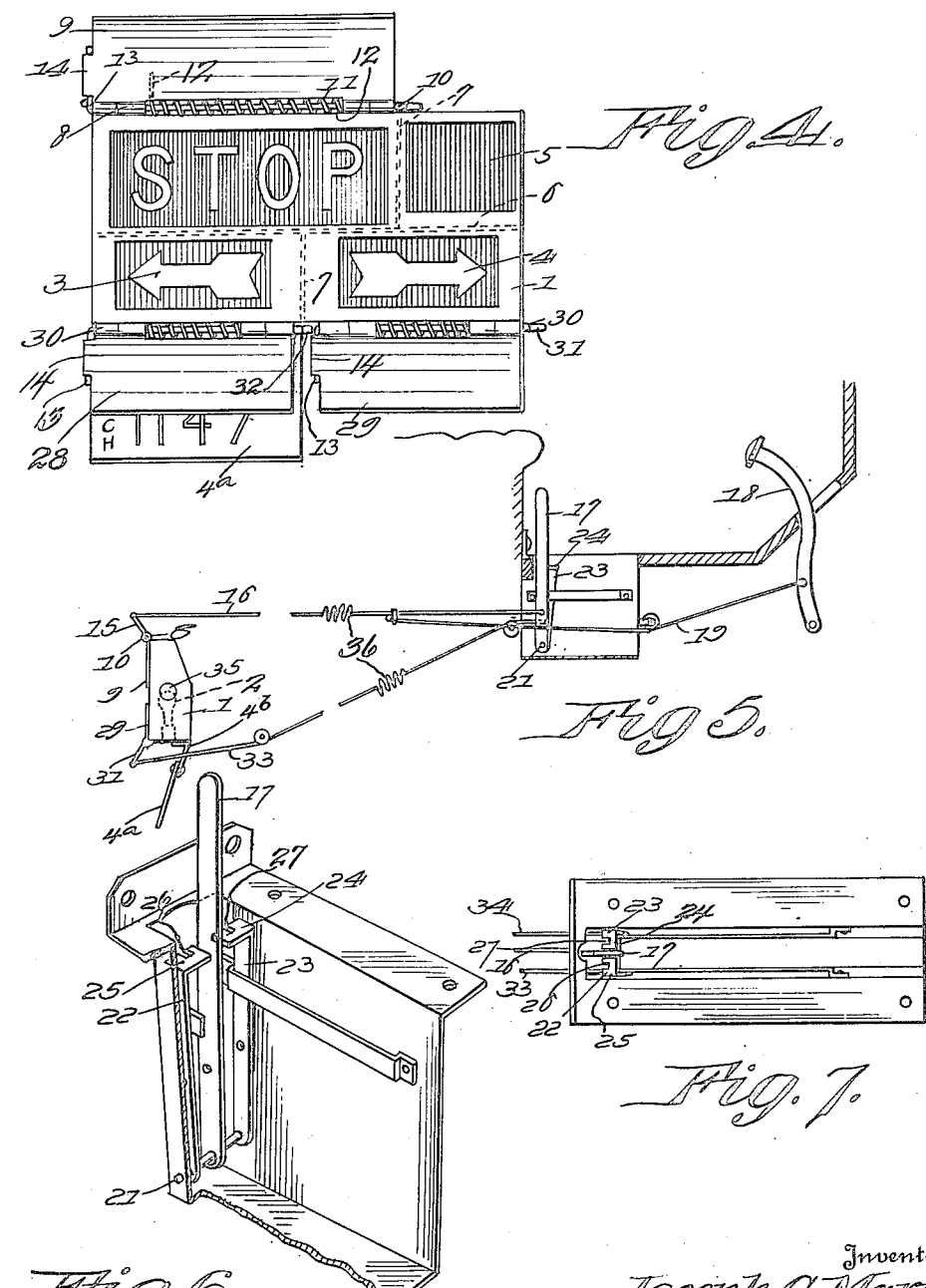

UNITED STATES PATENT OFFICE.

JOSEPH G. MARIS, OF DETROIT, MICHIGAN.

DANGER OR STOP AND DIRECTION SIGNAL.

1,384,205.  Specification of Letters Patent.  Patented July 12, 1921.

Application filed February 16, 1921. Serial No. 445,382.

*To all whom it may concern:*

Be it known that I, JOSEPH G. MARIS, a citizen of the United States, residing at Detroit, in the county of Wayne and State of Michigan, have invented certain new and useful Improvements in Danger or Stop and Direction Signals, of which the following is a specification, reference being had to the accompanying drawings.

It is the purpose of the present invention to provide a signal of this kind, for use on automobiles, for indicating the direction or stop signal to an automobile in the rear.

In providing a device of this character, a suitable housing for an electric bulb may be supported on the left hand fender of the rear of the automobile, there being a transparent rear wall of the housing, with indicating arrows and a danger or stop signal applied to the wall, in combination with means or closures for covering the signals under ordinary conditions, there being a red portion of the transparent rear wall exposed, so as to represent the usual tail light, with means to operate said closures, so as to expose any one or two of the signals at one time.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view of the improved danger or stop and direction signal as applied to the rear of an automobile, showing the stop or danger signal and one of the direction arrows exposed.

Fig. 2 is a similar view showing the stop or danger signal and the other direction arrow exposed.

Fig. 3 is a rear view, showing the direction arrows and danger signals covered, thereby showing the tail light.

Fig. 4 is a rear view of the signal apparatus showing the stop or danger signal and the two direction indicating signals exposed, though this condition never intentionally occurs.

Fig. 5 is a sectional view through a part of the forward portion of an automobile showing the actuator, with its connections to the signal apparatus.

Fig. 6 is a detail fragmentary perspective view of the actuator.

Fig. 7 is a plan view of the actuator and its casing.

Referring to the drawings, 1 designates a suitable housing, in which one or more electric light bulbs 2 are located. The rear wall of the housing is constructed of any suitable transparent material, preferably glass, the majority of which is painted a heavy dark red, with the exception of the word Stop 2ª, which indicates danger, and the two arrows 3 and 4. These arrows and the word Stop are painted white, so that the light on the interior of the housing will reflect through the word Stop and the white arrows, so as to render the signals plainly visible at night. As previously stated the majority of the glass or other transparent rear wall is painted a dark red, with the exception of the signals, and a small portion 5 of the rear wall adjacent one corner, which is painted a bright red. This bright red painted portion of the rear wall constitutes a tail light of the automobile, at all times whether the other signals are covered or exposed.

Metal strips extend longitudinally and transversely, for instance as indicated at 6 and 7, for dividing off the signals, as well as the tail light portion of the rear wall of the device, thereby reinforcing and strengthening the transparent rear wall of the housing. Similar strips are arranged on the interior of the housing adjacent the transparent wall.

Hingedly mounted at 8 on the upper rear corner of the housing is a closure or cover 9, the pivot pin 10 of which carries a coiled spring 11, the ends of which terminate in arms 12, one engaging the housing, and the other the closure, thereby holding the closure normally covering the danger or stop signal. The hinge pin of the closure 9 at one end terminates in an arm 13, about which an extension 14 of the closure fits. The other end of the hinge pin terminates in a crank arm 15, to which a wire or rod 16 is connected. This wire or rod 16 is connected to a master lever 17, which is mounted on the automobile slightly forward of the front seat. It is obvious that upon moving the master lever forwardly, a pulling action is imparted upon the wire or rod, which will move the closure 9 upwardly, and expose the stop or danger signal, thereby indicating to the chauffeur of the automobile in the rear, that it is the intention of the chauffeur of the forward automobile to stop. A wire or rod 19 is connected to the wire or rod 16, and is in turn connected to the usual service foot brake lever 18, so that in case of emergency and being that the foot of the operator is usually on or very close to the service foot brake lever, the closure 9 or the danger or stop signal may be very quickly actuated, though it is obvious that the master lever may be subsequently operated, in order to take up the slack in the connections with the cover 9.

Depending from the foot board forward of the front seat of the automobile is a V-shaped casing, between the walls of which the master lever 17 is pivotally mounted as at 21. The adjacent walls of the V-shaped casing are provided with guides, in which the auxiliary levers 22 and 23 are movable. These auxiliary levers are mounted pivotally upon the same pivot with the master lever. In fact the master and auxiliary levers are loosely pivoted, particularly the master lever, so as to permit lateral movement of the same, as well as forward pivotal movement. The auxiliary levers at their upper ends have right angle arms 24 and 25, which are provided with notches 26 and 27. These arms extend toward each other, but are sufficiently spaced, to permit the master lever to move between them, when it is desired to operate the closure 9 individually, namely without manipulating either one of the closures of the direction arrows. The purpose of loosely moving the master lever, is to permit the lever to move laterally, so that it may engage the notch of either one of the arms 24 and 25.

Closures 28 and 29 are pivotally mounted at 30 on the lower forward corner of the housing, and are designed for the purpose of covering the direction arrows 3 and 4. The hinge mounting and the spring tensioning means for the closures 28 and 29 are identical with the construction of the hinge mounting and tensioning means of the closure 9, so that said closures 28 and 29 may remain normally closed. The hinge pins of the closures 28 and 29 also have arms 31 and 32, and connecting the arm 31 and the auxiliary lever 23 is a wire or rod 33. Operatively connecting the arm 32 and the auxiliary lever 22 is a rod or wire 34. Obviously by moving the master lever to the left and engaging it with the notch 27 of the auxiliary lever 23, the lever 23 may be tilted forwardly, imparting a pulling action upon its wire or rod 34, causing the closure 28 to swing downwardly, hence exposing the left hand direction arrow. When the master lever is moved to the right, it will engage the notch 26 of the arm 25 of the lever 22, causing a pulling action to be imparted on the wire or rod 33, hence tilting the crank arm 31, and thereby swinging the closure 29 downwardly, to expose the right hand arrow, indicating to a chauffeur of the rear automobile that it is the intention of the chauffeur of the forward automobile to turn to the right.

It is obvious that the master lever may be actuated or moved forwardly without operating either one of the auxiliary levers, thereby moving the closure or cover 9 to an uppermost position, exposing the stop or danger signal independently of the direction arrows. The connecting wire between the covers or closures and the actuating levers may move in guides (not shown) fastened to the under part of the body of the automobile, in order to hold them in place. One end of the housing has an opening 35, through which the light reflects, so as to indicate a white light on the side, as is usually the case in tail lights.

The wires or rods or other pulling mediums 33 and 34 are provided with yieldable connections 36. The yieldable connections are of such construction as to not tension the closures when in their closed positions, as the springs on the hinges or pivot rods of the closures are of greater tension, and act to keep the closures in their closed positions. However these yieldable connections 36 are designed for the purpose of taking up the slack in the wires or rods or cables, when it happens that the stop or danger signal is actuated by the service foot lever. The slack will not be taken up, until the master lever is moved, and then the cables will remain taut, as long as the master lever is held in forward moved position.

It is obvious that the arrow direction signals may be eliminated entirely, particularly when the device is used on small automobiles. In this case only the stop or danger signal and the ordinary red tail light are employed and when so used the device may be fastened to the rear of the left hand corner of the automobile adjacent the top. The closure 9 for the stop or danger signal may be operated by a wire or cord disposed along the bow of the top to the front of the car, in order to be in convenient place for the driver or chauffeur, whereby the closure may be operated. In the operation of the device when so employed, the chauffeur, when it is desired to turn to the left, may drive the automobile at an angle toward the center of the street and at the same time exposing the stop signal, indicating to the chauffeur of the automobile in the rear that it is the intention to turn to the left. In turning to the right the chauffeur may keep close to the curb on the right hand side of the street, with the stop signal exposed, indicating the intention to turn to the right at the corner. Secured preferably on the mud guard, though it may be secured any other suitable place, is a license number plate carrier 4$^b$, which also supports the housing of the direction signal. A license number plate 4$^a$ is also fastened to the carrier 4$^b$, in such a position beneath the housing, so that the rays of light on the interior of the housing may reflect through an opening or slot (which may be formed in the bottom of the housing) upon the number of the license number plate, thereby disclosing the license number at night.

The invention having been set forth, what is claimed as being useful is:

In a direction signal, a housing having an illuminated interior and provided with a transparent rear wall, a portion of said rear wall being surface colored to provide a tail light reflection, a greater portion of the rear wall being surface colored darker than the first colored portion, said rear wall having white colored arrows and a danger or stop signal applied thereto, through which the interior illumination of the housing reflects, and spring tension shields normally covering said signals of the rear wall, and means for operating one of said shields individually, or one of said shields and one of the other shields simultaneously.

In testimony whereof I hereunto affix my signature.

JOSEPH G. MARIS.